July 12, 1949.   H. M. EVJEN   2,475,827
ELECTRICAL MEASURING SYSTEM
Filed Nov. 6, 1945
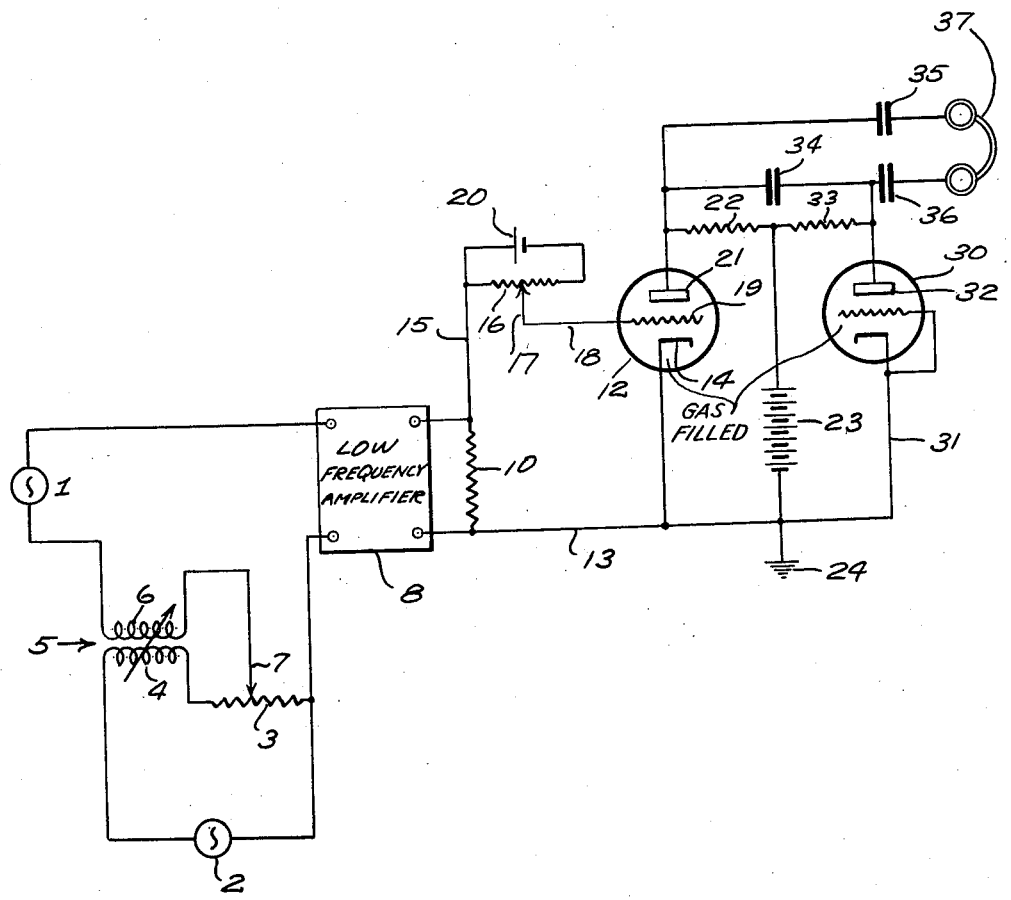
INVENTOR
HAAKON M. EVJEN
BY
ATTORNEY Patented July 12, 1949

2,475,827

UNITED STATES PATENT OFFICE 2,475,827

ELECTRICAL MEASURING SYSTEM

Haakon M. Evjen, Houston, Tex., assignor to Nordel Corporation, Houston, Tex., a corporation of Delaware Application November 6, 1945, Serial No. 627,030

2 Claims. (Cl. 175—183)

This invention relates to electrical measuring systems and more particularly to a system for making null balance measurements at low frequencies.

An object of the invention is to provide a system of the above type having novel and improved features of operation.

Another object is to provide a system of the above type which is adapted to accurate adjustments and readings and which is simple to operate.

Various other objects and advantages will be apparent as the nature of the invention is more fully understood.

The present invention produces either an audible or a visible indication of any unbalance between the unknown potential and the standard potential with which it is being compared. For this purpose the unbalance is used as a control voltage to modulate a source of audible frequency. In one embodiment the control voltage is applied to a grid controlled oscillator which is adjusted to operate when the control voltage exceeds a predetermined value. The oscillator is connected to energize headphones, a loud speaker or a visual indicator such as a glow tube.

The control voltage may also be used to modulate an audible carrier by other means such as a balanced modulator.

Such low frequency measurements are particularly applicable to low frequency geophysical exploration systems for detecting sub-surface foreign bodies or sub-surface anomalies such as deposits of oil or other minerals. An example of such a system is shown in my Patent No. 2,375,775 dated May 15, 1945 for Electrical prospecting systems. The invention is also applicable to other fields requiring accurate measurements of low frequency potentials.

Although the novel features which are believed to be characteristic of this invention are pointed out more particularly in the appended claims, the nature of the invention will be better understood by referring to the following description taken in connection with the accompanying drawing in which a specific embodiment has been set forth for purposes of illustration.

In the drawings the figure is a schematic diagram of a null-balance measuring system embodying the present invention.

Referring more particularly to the embodiment shown in the drawing, the invention is shown as applied to a system for balancing a low frequency potential to be measured from a source 1 against a standard potential of the same frequency from a source 2. The source 2 is connected across a potentiometer 3 and the primary 4 of a variometer 5 in series. One side of the source 1 is connected through the secondary 6 of the variometer 5 to a tap 7 on the potentiometer 3, one side of the potentiometer 3 and the other side of the source 1 are connected to the input circuit of a low frequency amplifier 8 which may be of any standard type having a low noise level.

The output of the amplifier 8 is connected across a resistor 10 which is connected in the grid circuit of an oscillator tube 12 of the gas filled type. One side of the resistor 10 is connected by a line 13 to the cathode 14 of the tube 12 and the other side of the resistor 10 is connected by a line 15 to one side of a potentiometer 16, the variable tap 17 of which is connected by a line 18 to the grid 19 of the tube 12. A battery 20, such as a "C" battery is connected across the potentiometer 16. The plate 21 of the tube 12 is connected through a resistor 22 to a "B" battery 23, thence to the return line 13 which is grounded at 24.

The grid and cathode of a gas filled tube 30 are connected by a line 31 to the ground line 13 and its plate 32 is connected through a resistor 33 to the "B" battery 23. A condenser 34 is connected across the resistors 22 and 33. The tubes 12 and 30 and associated circuits constitute a relaxation oscillator, the frequency of which is determined by the values of the condenser 34, resistors 22 and 33 and the potential of the battery 23.

The plates 21 and 32 are connected through blocking condensers 35 and 36 respectively to a signal device 37 shown as headphones. The device 37 may, however, represent a loud speaker or a gas glow tube or other signal device.

In operation the resistors 22 and 33, the condenser 34 and the battery 23 are chosen to give the oscillator the desired frequency. The state of oscillation is controlled by the grid bias on the tube 12. In the operation, the potential from the battery 23 which is applied across the anode-cathode circuits of tubes 12 and 30 causes one of these tubes to become conductive. Assume, for example, that the tube 30 is thus made conductive. This immediately reduces the potential across the tube 12 to the voltage drop through the tube 30 which is quite small. However, the current flowing through the resistor 33 produces a voltage drop across the resistor which is equal to the voltage of the source 23 minus the voltage drop across the tube 30. This produces a potential difference on the two sides of the condenser 34 and charges the condenser. When the voltage of the condenser rises to a critical value, the tube 12 becomes conductive. The condenser then discharges through the tubes 12 and 30 and in so doing extinguishes the tube 30. The process then repeats itself, the condenser 34 again being charged by the voltage drop across the resistor 22 due to the current flowing through the tube 12 and rendering the tube 30 conductive when the condenser voltage reaches a critical value, whereupon the condenser discharges through tubes 12 and 30 and extinguishes the tube 12. This process continues at a frequency dependent upon the value of the condenser 34, the resistors 22 and 33 and the potential of the source 23 as long as the biasing potential on the grid 19 of the tube 12 permits that tube to operate. When this biasing potential increases to a value to block tube 12, the oscillations cease and a steady current then passes through the tube 30.

It is noted from the above that the oscillator operates at a fixed frequency which is independent of the biasing voltage on the grid 19, but the state of oscillation is controlled by said biasing voltage. It has been found that the circuit characteristics of the relaxation oscillator above described may be made sufficiently constant so that a variation in the grid bias of only 2 millivolts provides a positive control of the state of the oscillator. That is, when the bias is properly adjusted to a point to block the oscillator, an increase in bias of only 2 millivolts will cause the oscillations to start.

The potentiometer 16 and battery 20 may be used to adjust the grid bias to its proper value so that the voltage drop across the resistor 10 produced by the output of the amplifier 8 will have the control function.

The value of the voltage drop across the resistor 10 may be measured by adjusting the potentiometer 16 to a point at which oscillations stop, and noting the position of the tap 17 by a suitable scale if desired. The system thus serves as an accurate voltage measuring device.

For a comparison of the unknown voltage from source 1 with the known voltage from source 2, the potentiometer 3 is adjusted to balance out the in-phase component of the voltage from the source 1 and the variometer 5 is adjusted to balance out the quadrature component. When both adjustments have been made a null balance is obtained and no voltage is supplied to the amplifier 8 for amplification therein. The voltage drop across the resistor 10 thus falls to a value such that the oscillator becomes blocked. Hence the point of null balance is noted as the setting of the potentiometer 3 and variometer 5 when the signal from the oscillator ceases. Conversely, the elements may be preadjusted for a null balance and an unbalance will be evidenced by the start of oscillations. This may be effected by making the relative adjustments and connections of the battery 20, potentiometer 16 and resistor 10 such that the oscillator becomes unblocked at null balance conditions and remains blocked when a voltage is produced across the resistor 10 due to an unbalance. Also the control effect may be obtained when the unbalance exceeds a predetermined value. Hence the system is not restricted to strictly null balance conditions.

It has been found that the above system provides an accurate measurement of low frequency potentials such as those involved in making geophysical observations of the type set forth in my Patent No. 2,375,775 above mentioned. The present measuring system eliminates the necessity for rectification of the voltages before comparison, provided their frequencies are identical. It is also applicable to higher frequency measurements by making the necessary changes in circuit constants.

It is to be understood that other standard modulation systems may be used in which an audible frequency is modulated by the control voltage to render the same audible. A grid controlled oscillator has been shown as illustrative only. A balanced modulator of well known construction may be used in which case the audible frequency source is connected to one input of the modulator and the control signal to the other input so that the output represents the audible signal modulated at the control frequency.

Although a specific embodiment has been shown for purposes of illustration, it is to be understood that the invention is capable of various uses and adaptations as will be readily apparent to a person skilled in the art. The invention is only to be restricted in accordance with the scope of the following claims.

What is claimed is:

1. A system for measuring an unknown alternating electrical potential of a known low frequency, comprising a source of a known alternating electrical potential of the same low frequency as said unknown potential, a comparing circuit series connected to said source and to said unknown potential, means including resistance and reactance elements in said circuit connected across one of said potential sources and in series with the other of said potential sources to control the phase and amplitude relationship between said potentials, an audio frequency oscillator including a tube having a control electrode, signal means connected to respond to the operation of said oscillator, a control circuit connected to supply a biasing voltage to said control electrode suited to control the state of oscillation of said oscillator, means for adjusting said biasing voltage to a critical value at the threshold of oscillation, means connecting said comparing circuit to superimpose the resultant of said known and unknown potentials upon said biasing potential, and means for adjusting said resistance and reactance elements to obtain a null balance between said known and unknown potentials and thereby restore said critical biasing voltage so that the adjusted value of said resistance constitutes a measure of said unknown potential.

2. An apparatus for measuring an unknown alternating electrical potential of low frequency, as set forth in claim 1, in which the resistance and reactance elements constitute a potentiometer and a variometer.

HAAKON M. EVJEN.

REFERENCES CITED

The following references are of record in the file of this patent:

UNITED STATES PATENTS

| Number | Name | Date |
|---|---|---|
| 1,397,228 | Nyquist | Nov. 15, 1921 |
| 1,588,539 | Fortescue | June 15, 1926 |
| 1,793,835 | Bruce | Feb. 24, 1931 |
| 2,162,508 | Knowles | June 13, 1939 |
| 2,230,502 | Pearson | Feb. 4, 1941 |
| 2,247,728 | Langer | July 1, 1941 |
| 2,364,957 | Douglas | Dec. 12, 1944 |
| 2,373,079 | Morelock | Apr. 3, 1945 |

OTHER REFERENCES

Drysdale, Institution of Electrical Engineers Journal, vol. 68, 1930, pages 344–345.